United States Patent [19]

Koroscil

[11] Patent Number: 4,640,193

[45] Date of Patent: Feb. 3, 1987

[54] CHEMILUMINESCENT LIGHT CONTAINER

[75] Inventor: Anthony Koroscil, Escambia, Fla.

[73] Assignee: American Cyanamid Company, Stamford, Conn.

[21] Appl. No.: 813,345

[22] Filed: Dec. 26, 1985

[51] Int. Cl.$^4$ ................................................ F42B 4/26
[52] U.S. Cl. .................... 102/336; 102/282; 42/15; 362/34
[58] Field of Search .............. 102/336, 282; 42/15; 362/34

[56] References Cited

U.S. PATENT DOCUMENTS

| | | | |
|---|---|---|---|
| 1,329,503 | 2/1920 | Casey | 102/282 X |
| 2,775,938 | 1/1957 | Wade | 102/336 X |
| 3,070,955 | 1/1963 | Kallin et al. | 102/336 X |
| 3,273,499 | 9/1966 | Proell | 102/336 X |
| 3,478,687 | 11/1969 | Craig | 102/336 X |
| 3,774,022 | 11/1973 | Dubrow et al. | 102/336 X |
| 3,813,795 | 6/1974 | Marshall et al. | 42/15 |
| 3,938,465 | 2/1976 | Lyons | 362/34 X |
| 4,064,428 | 12/1977 | Van Zandt et al. | 362/34 X |
| 4,379,320 | 4/1983 | Mohan et al. | 362/34 X |

FOREIGN PATENT DOCUMENTS 3236418  1/1982  Fed. Rep. of Germany ...... 102/336

*Primary Examiner*—Peter A. Nelson
*Attorney, Agent, or Firm*—Frank M. Van Riet

[57] ABSTRACT

A container adapted for insertion into a device is disclosed wherein the container has fitted into its hollow interior the components required to form therein and eject therefrom a chemiluminescent light emitting material.

8 Claims, No Drawings

CHEMILUMINESCENT LIGHT CONTAINER

BACKGROUND OF THE INVENTION

One of the most important requirements in the training of military personnel, especially in those branches of the service wherein there is a need to train in the area of projectiles e.g. bombs, shells etc., is the ability to detect the accuracy of the subject being trained. In the air force, for example, it is important to be able to determine the accuracy of bombing etc. in order to calibrate equipment and train pilots and bombardiers.

Presently there is being used various devices for determing the exact area in which a projectile falls. The most used devices are pyrotechnics which produce a flash of light and a puff of smoke to indicate the site of projectile impact. One such device employs titanium tetrachloride which produces a cloud of smoke when it reacts with the moisture in the air on impact. A second such device is a red phosphorus bearing projectile which emits a flash of light upon impact.

The problems attendant these types of detection devices are numerous. The main problems, however, are that the phosphorus device generates light by burning and, as a result, many items with which the burning phosphorus comes into contact also burn i.e. trees, shrubs; grass etc. while the titanium tetrachloride devices, because they only emit smoke, are practically useless for nighttime detection.

Amine materials known to emit chemiluminescent light on contact with the atmosphere have also been used however, the light emitted is not of a high enough intensity to provide accurate detection.

SUMMARY OF THE INVENTION

A novel container adapted for insertion into a device for use in creating a signal has been devised. The container has fitted into its interior, a fuse or percussion cap, a propellant, a chemiluminescent light activator solution, a chemiluminescent light fluorescer solution, a reactive enhancer and a sealing means. The chemiluminescent light which is produced upon impact of the device is of higher intensity and shorter duration than previously exhibited.

DESCRIPTION OF THE INVENTION INLCUDING PREFERRED EMBODIMENTS

A typical practice device which is utilized in the training of personnel and which creates a detectible signal upon impact normally is of a tear-drop configuration with a hollow core running its entire length. A cartridge fits into the hollow core at the front end of the device. A firing pin at the front end of the device detonates the cartridge upon impact and the signal is emitted through the hollow core at the rear end in the form of a flash of light, smoke etc.

Projectile impact accuracy is normally evaluated by camera from an elevated platform at a distance of one-half to one mile from the target site. Visual inspection of the target site after completion of the test firings or droppings is also used.

Any signal device therefore has to emit a signal which is detectable by the camera if manual inspection of the target site, the least desired method, is to be avoided. Clearly, the higher the light intensity of the signal, the more easily detectable it is.

The novel containers of the present invention are useful for both day and night practice and do not function by burning i.e. they are cold, and therefore are free from the disadvantages attendant present devices. They provide non-pyroforic, chemical light illumination as a spray of light which can be blue, yellow or green. A secondary benefit is the formation of colored smoke which can be detected in daylight. The instantaneous spray of chemical light lasts preferably less than about thirty (30) seconds and is visible for at least one (1) mile.

The instant invention comprises a hollow container adapted for insertion into a device for use in creating a signal and having fitted into the hollow space or interior thereof, in the following sequence, order or relationship, (a) a fuse or percussion cap,
(b) a propellant,
(c) a chemiluminescent light activator solution,
(d) a chemiluminescent light fluorescer solution,
(e) a reactive enhancer capable of catalyzing the reaction produced upon contact of (c) and (d) which occurs upon detonation of said fuse or cap and,
(f) a sealing means.

The containers of the present invention are preferably prepared from a metal such as aluminum however, any other material known for the purpose e.g. plastic, may also be used. They generally range in length from about 6–18 inches, preferably 9–15 inches, and in outer diameter from $\frac{1}{2}$ to $1\frac{1}{2}$ inches preferably, about $\frac{3}{4}$ to 1 inch.

The containers have a fuse or percussion cap (a) fitted into one end and then, in sequence, the remaining contents thereof. The fuse or percussion cap can be of any configuration or type and is merely a means of igniting the prepellant upon impact of the projectile which is being tested.

The next ingredient, is a propellant (b) and any material known to be useful as such may be used. The preferred propellant is gun powder. Sufficient gunpowder to cause mixing of (c) and (d) upon impact is employed.

The chemiluminescent light activator solution (c), which is preferably used encapsulated within a thin glass ampule, but can be used as such if kept separated from the fluorescer solution, is known in the art. It contains water, catalyst, hydrogen peroxide and solvent. Typical solutions of this type can be found in any one of the following U.S. Pat. Nos.; 3,749,679; 3,391,018; 3,391,069; 3,974,368; 3,557,233; 3,597,362; 3,775,336 and 3,888,786, incorporated herein by reference. Preferred solvents include esters, aromatic hydrocarbons and chlorinated hydrocarbons, of which the esters are most preferred, specifically, a mixture of dimethylphthalate and t-butyl alcohol. Preferred catalysts include those of U.S. Pat. No. 4,313,843, and even more preferably sodium salicylate, sodium 5-bromosalicylate, sodium 5-chlorosalicylate, sodium 5-fluorosalicylate, lithium salicylate and rubidium acetate.

Similarly, the fluorescer solution (d), which is also preferably used encapsulated in a thin, glass ampule, includes, oxalate, of which bis(2,4,5-trichloro-6-carbopentoxyphenyl)oxalate is preferred, and fluorescer of which rubrene; N,N'-bis(2,5-di-t-butylphenyl)-3,4,9,10-perylenedicarboximide; 9,10-diphenylanthracene, 1-chloro-9,10-bis(phenylethynyl)anthracene are exemplary, see the above-mentioned patents for further exemplary fluorescer solutions. Esters such as dibutylphthalate are the preferred solvents, see also U.S. Pat. Nos. 3,816,326; 4,313,843, incorporated herein by reference.

The containers of the present invention contain the chemiluminescent light components in concentrations which enable the initial outburst of light upon detonation to be very intense for a short period of time. This result is achieved by the use of catalyst in solution with hydrogen peroxide in combination with the reactive enhancer.

The following table sets forth the useful concentration ranges of each ingredient of the chemiluminescent light activator component (c) in the container.

TABLE I

| Ingredient | Concentration* Range | Concentration* Preferred |
|---|---|---|
| Hydrogen peroxide | 4–15% | 7–10% |
| Catalyst[1] | 0.01–0.7% | 0.03–0.2% |
| Water | 0.0–2.3% | 1.0–1.6% |
| Solvent[2] | remainder | |

*by weight, based on total weight of solution
[1] a preferred catalyst comprises sodium 5-bromosalicylate or sodium salicylate, alone or in admixture,
[2] the solvent mixture which is preferred contains 75–90%, by weight, of dimethylphthalate and 10–25%, by weight, of tert-butyl alcohol.

The reactive enhancers (e) play a critical role in the chemiluminescent light display formed upon detonation of the container of the present invention. The container, upon impact and detonation, forms a concentration area of chemiluminescent light display, of a preferred diameter and preferably at a height which enables vision thereof from a distance of at least one mile. The reactive enhancer reacts with the chemical constituents of the activator and fluorescer solutions which form the chemiluminescent light and thereby enhance the intensity thereof.

The reactive enhancer is a material which may normally be a catalyst for the chemiluminescent light reaction but is employed in larger amounts and as a solid material. It chemically reacts with the chemiluminescent light components thereby enhancing the light intensity thereof. Suitable reactive enhancers which have been found to be effective for this purpose include sodium salicylate, potassium salicylate, rubidium acetate, lithium acetate, lithium trifluoroacetate, sodium benzoate, magnesium sulfate, potassium benzoate and the like. Generally any catalyst known to activate the reaction between components of chemiluminescent light reactions and which are solid may be used. The reactive enhancer may be used alone or in admixture with a solid inert material such as infusorial earth; shredded plastic foam; and the like. Most of the reactive enhancer must be positioned in the container between the fluorescer solution and the sealing means, however, small amounts of reactive enhancer may be placed between the propellant and activator solution, if desired. Separate layers of enhancer components may be used also.

The sealing means (f) merely comprises a closure of the end of the container to keep the components intact and tightly compressed together. It can comprise a wad of soft material alone or in combination with a screw or compression cap, for example. The wad can range in thickness from 2–10 millimeters.

The following examples are set forth for purposes of illustration only and are not to be construed as limitations on the present invention except as set forth in the appended claims. All parts and percentages are by weight unless otherwise specified.

EXAMPLES 1–18

Simulation of a bomb exploding on impact with the ground is achieved by detonating a 12 inch long, 13/16 inch diameter container in a cannon. The container has an enclosed end containing a fuse and is then packed, in sequence, as follows: smokeless, black gunpowder; a 10 ml glass ampule of activator solution; a 12 ml glass ampule of fluorescer solution; reactive enhancer; seal.

Table I, below, sets forth the average of the observer ratings for light intensity and smoke density. Smoke density was only rated at the target site. Light intensity ratings are given at target site and at distances of ½ and ¾–1 mile.

The container is inserted into the rear end of a Cannon and fired from the cannon set at an angle of 10–15 degrees. There is a 5–15 mph variable breeze, a clear, moonless sky and excellent visibility. The air temperature is 50°–55° C.

The following is a compilation of the activator solutions and fluorescer solutions employed.

| | Activator #1 | Activator #2 |
|---|---|---|
| Dimethylphthalate | 75.0 parts | 81.21 parts |
| t-butylalcohol | 14.7 parts | 12.64 parts |
| 86.9% organic process $H_2O_2$ | 9.2 parts | 4.71 parts |
| Sodium Salicylate | — | 0.0324 part |
| Sodium 5-Bromosalicylate | — | 0.04 part |
| Water | 1.0 parts | 1.37 parts |

| | Fluorescer #1 | Fluorescer #2 | Fluorescer #3 |
|---|---|---|---|
| Dibutyl Phthalate | 83.67 parts | 91.15 parts | 91.27 parts |
| Oxalate* | 15.94 parts | 8.59 parts | 8.60 parts |
| Fluorescer** | 0.39 part | — | — |
| Fluorescer*** | 0.001 part | — | — |
| Rubrene | — | 0.26 part | 0.13 part |

| ENHANCERS | | | | |
|---|---|---|---|---|
| | Sodium Salicylate (S) | Sodium Salicylate and Infusorial Earth (SI) | Sodium Salicylate and finely shredded foam $(SF)_1$ | Sodium Salicylate and finely shredded foam $(SF)_2$ |
| Charge Parts | 26 parts 1 | 26 parts 0.38 | 5.4 parts 0.328 | 5.4 parts 0.597 |
| Sodium Salicylate per part of charge | | | | |

*bis(2,4,5-trichloro-6-carbopentoxyphenyl)oxalate
**1-chloro-9,10-bis(phenylethynyl)anthracene-yellow
***N,N[1]-bis(2,5-di-t-butylphenyl)-3,4,9,10-perylenedicarboximide Table II below, sets forth the different components of the container beginning from the fuse end (left) to the discharge end.

TABLE II

| Example | Gunpowder (parts) | Pre-enhancer (parts) | Activator (#) | Fluorescer (#) | Enhancer S/(parts) | Enhancer Symbol |
|---|---|---|---|---|---|---|
| 1 | 2 | — | 2 | 1 | — | S |
| 2 | 3 | — | 2 | 1 | 2 | $(SF)_1$ |
| 3 | 2 | — | 1 | 3 | — | S |
| 4 | 2 | ½$(SF)_2$ | 1 | 3 | 2 | ½$(SF)_2$ |
| 5 | 2 | — | 1 | 2 | 2 | $(SF)_2$ |
| 6 | 2 | 2S | 1 | 2 | 2 | SI |
| 7 | 3 | — | 1 | 3 | — | S |
| 8 | 3 | — | 1 | 3 | 2 | $(SF)_1$ |
| 9 | 3 | — | 1 | 3 | 2 | SI |
| 10 | 3 | — | 1 | 2 | — | S |
| 11 | 3 | ½S | 1 | 2 | — | ½S |
| 12 | 2 | — | 2 | 3 | 2 | $(SF)_2$ |

TABLE II-continued

| Example | Gunpowder (parts) | Pre-enhancer (parts) | Activator (#) | Fluorescer (#) | Enhancer S/(parts) | Enhancer Symbol |
|---|---|---|---|---|---|---|
| 13 | 2 | — | 2 | 3 | 2 | SI |
| 14 | 2 | — | 2 | 2 | — | S |
| 15 | 2 | — | 2 | 2 | 2 | (SF)$_1$ |
| 16 | 3 | 2S | 2 | 3 | 2 | (SF)$_1$ |
| 17 | 3 | — | 2 | 2 | — | S |
| 18 | 3 | — | 2 | 2 | 2 | (SF)$_2$ |
| 19 | 3 | 2S | 2 | 2 | — | SI |
| 20 | 2 | 2S | 2 | 2 | 2 | (SF)$_2$ |
| 21 | 2 | — | 1 | 1 | — | S |
| 22 | 3 | — | 1 | 1 | 2 | (SF)$_1$ |
| 23 | 3 | 4S | 1 | 2 | — | SI |
| 24 | 3 | 4S | 1 | 1 | — | SI |
| 25 | 2 | 3SI + 2S | 2 | 2 | — | SI |

The following table provides the average observed rating of light intensity and smoke density of the 25 firings. In the table, the Light Intensity Ratings are as follows:

Excellent—100
Very good—85
Good—75
Fair—65
Poor—50

The Smoke Density Ratings are as follows:

Dense—5
Moderate—4
Light—3
Very Light—2
None—1

TABLE III

| Example | Light Intensity Rating | Smoke Density Rating |
|---|---|---|
| 1 | 66.7 | 2.8 |
| 2 | 74.2 | 3.3 |
| 3 | 72.5 | 3.6 |
| 4 | 80.0 | 3.8 |
| 5 | 76.7 | 3.5 |
| 6 | 73.3 | 3.4 |
| 7 | 63.3 | 2.8 |
| 8 | 82.5 | 4.6 |
| 9 | 73.3 | 3.0 |
| 10 | 86.7 | 4.1 |
| 11 | 53.7 | 2.2 |
| 12 | 85.0 | 4.2 |
| 13 | 75.0 | 3.3 |
| 14 | 81.7 | 3.7 |
| 15 | 84.2 | 4.2 |
| 16 | 86.7 | 4.0 |
| 17 | 86.7 | 4.1 |
| 18 | 91.7 | 4.3 |
| 19 | 83.3 | 4.3 |
| 20 | 89.2 | 4.5 |
| 21 | 70.8 | 4.0 |
| 22 | 70.0 | 3.2 |
| 23 | 86.7 | 4.0 |
| 24 | 65.0 | 3.5 |
| 25 | 87.5 | 4.4 |

EXAMPLE 26

Replacement of the reactive enhancer of Example 17 with rubidium acetate results in similar observations.

EXAMPLE 27

Example 10 is repeated except that the oxalate is replaced by 9,10-bis(phenylethynyl)anthracene. Similar results are achieved.

EXAMPLE 28

Example 18 is repeated using 9,10-diphenylanthracene with 40 ppm of N,N'-bis(2,5-di-t-butylphenyl)-3,4,9,10-perylenecarboximide. Again excellent results are achieved.

I claim:

1. A hollow container adapted for insertion into a device for use in creating a signal and having fitted into the hollow space thereof, in the following sequence,
   (a) a fuse or percussion cap,
   (b) a propellant,
   (c) a chemiluminescent light activator solution,
   (d) a chemiluminescent light fluorescer solution,
   (e) a reactive enhancer capable of catalyzing the reaction product produced upon contact of (c) and (d) which occurs upon detonation of said fuse or cap and
   (f) a sealing means.

2. A container in accordance with claim 1 wherein (e) is sodium salicylate.

3. A container in accordance with claim 1 wherein (c) is a t-butyl alcohol dimethyl phthalate solution of hydrogen peroxide and sodium salicylate.

4. A container in accordance with claim 1 wherein (d) is a dibutyl phthalate solution of fluorescer and bis(2,4,5-trichloro-6-carbopentoxyphenyl)oxalate.

5. A container according to claim 1 wherein (c) is a t-butyl alcohol-dimethyl phthalate solution of hydrogen peroxide, sodium salicylate and sodium 5-bromosalicylate and (d) is a dibutyl phthalate solution of rubrene and bis(2,4,5-trichloro-6-carbopentoxyphenyl)oxalate.

6. A container according to claim 5 wherein (e) is sodium salicylate and infusorial earth.

7. A container according to claim 1 wherein (e) is sodium salicylate and shredded plastic foam.

8. A container according to claim 4 wherein the fluorescer is rubrene.

* * * * *